3,085,875
TREATMENT OF MANGANESE ORES
Sidney J. McCarroll, Henderson, Nev., assignor to Howe Sound Company, New York, N.Y., a corporation of Delaware
No Drawing. Filed Jan. 4, 1960, Ser. No. 66
13 Claims. (Cl. 75—101)

The present invention relates to the extraction of manganese from ores containing same in a valence state greater than two.

Numerous prior procedures have been proposed for the recovery of manganese from ores which contain the manganese in the form of manganese oxide ($MnO_2$) or the like. However, all of these procedures suffer from one or more disadvantages which seriously limit their use. Accordingly, the principal object of the present invention is the provision of an improved method for the recovery of manganese values from minerals containing same in a high valence state.

Another object of the invention is to provide a method for extracting manganese from manganese oxide ($MnO_2$) ores or the like. A more specific object of the invention is the provision of a method for preparing an acid solution of divalent manganese salt from ores containing manganese oxide or other reducible manganese compounds wherein the manganese has a valence greater than two. Still another object of the invention is the provision of a simple straightforward and commercially attractive method for effectively separating manganese from ores containing same in a high valence state. Other objects will also be hereinafter apparent.

Broadly stated, the present process comprises digesting manganese oxide ($MnO_2$) mineral or the like with a dilute aqueous solution of a mineral acid, specifically sulphuric acid, hydrochloric acid or mixtures thereof, in the presence of a primary reducing sugar. This effects reduction of the manganese and dissolution thereof in the form of its acid salt. The resulting mixture of dissolved manganese and residual undissolved mineral may then be filtered to obtain a useful solution of manganese sulphate or chloride. The residual mineral may be reprocessed, if desired.

The method of the invention may be effectively carried out by admixing the manganese containing ore with acid solution containing the reducing sugar. The resulting admixture is then preferably heated to, for example, 150°–180° F., while stirring for a period of time sufficient to reduce a significant amount of the manganese and form manganese sulphate or chloride. Normally, the digestion may be carried out over a period of time varying from 1 to 2 hours, although other times may be used. Double digestion of the ore using only half of the total molasses or reducing sugar for each digestion results in increased extraction and lower molasses or sugar consumption. Thus, under otherwise identical conditions, a larger amount of manganese may be extracted using a two stage digestion with only 50% of the total reducing sugar in each digestion than is extracted in a single digestion using the total amount of reducing sugar.

The present method may be used with any manganese oxide ores or the equivalent in which the manganese is present in a valence state greater than two, but is most effective with high grade ores, i.e., ores containing manganese in amounts of the order of 20 to 45% by weight. Typical minerals containing manganese oxide or other reducible forms of manganese compounds suitable for use herein include those wherein the manganese is admixed with magnesium oxide, calcium oxide, silicon dioxide, etc., as additional components.

Any primary reducing sugar capable of reducing the manganese into acid soluble form may be used for the purposes of the present invention. As typical examples, there may be mentioned glucose and fructose. These sugars may be used in the refined or crude form and they also may be formed in situ. For example, ordinary sucrose sugar may be used because it is inverted to glucose and fructose when added to the acid solution. This reaction may be illustrated as follows:

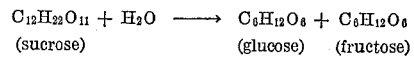

According to a preferred aspect of the invention, molasses may be used to supply the reducing sugar. Corn syrup is also satisfactory but the use of molasses is especially advantageous because this material works very effectively and is much less expensive than refined sugars. Molasses, as obtained from conventional sugar extraction procedures, comprises glucose and fructose and some residual sucrose in varying proportions depending upon the source. For example, cane sugar mollasses may contain 5 to 10% glucose, 30 to 40% fructose and 30 to 40% sucrose. Beet sugar molasses, on the other hand, may contain as much as 50% sucrose or more and minor amounts of other sugars. Residual sucrose in molasses is effective herein by conversion, as noted above, to glucose and/or fructose.

The amount of reducing sugar may be varied over a fairly wide range. For example, from about 0.25 to 2.0 grams of molasses, or the equivalent amount of reducing sugar (i.e. 0.25 to 2.00 grams), may be satisfactorily used per each gram of manganese in the ore to be extracted. The optimum amount of reducing sugar in any case will depend on other operating conditions, e.g. the digesting temperature and time, acid concentration and degree of extraction desired. All other conditions being the same, the degree of extraction increases as the amount of molasses or reducing sugar is increased.

As noted, the mineral acid may comprise either sulphuric acid or hydrochloric acid or mixtures of these acids, widely varying acid concentrations being suitable. However, in contrast to prior extraction procedures which require the use of concentrated acid, the invention is particularly effective with dilute acid solutions. Thus, for example, the acid concentration need not be in excess of up to about 10% by weight although a concentration as high as 20% or as low as 1% may be used. A preferred range of acid concentrations is 1 to 20% by weight with about 10% preferred for optimum results.

Sufficient amount of the acid solution should be used to permit easy digestion of the mineral therewith. Usually, from 10 to 15 parts by weight of acid solution per part of mineral give satisfactory results although proportions outside this range may also be used.

The invention is illustrated, but not limited, by the following examples wherein parts and percentages are by weight unless otherwise indicated.

*Example 1*

10 grams of manganese ore (containing 23.52% Mn in the form of $MnO_2$ and the following other constituents 2.0% MgO, 1.3% CaO, 55% $SiO_2$) were ground to 100 mesh or finer. The ore was then pulped with 100 ccs. of 10% sulphuric acid solution to which 0.25 gram of molasses had been added. The molasses in this case comprised 40% glucose; 40% fructose; 5% sucrose and the following other ingredients, water and undetermined reducing sugars.

The resulting acid/ore mixture was then heated at 150–180° F. with stirring for 2 hours. The solution containing dissolved manganese sulphate was then filtered from the undissolved residue. The solution contained approximately 51% of the manganese content originally present in the ore.

Example 2

The process of Example 1 was repeated using 2.0 grams of molasses. A 98% extraction was obtained.

Example 3

Examples 1 and 2 were repeated using a manganese ore containing 19.49% Mn in the form of manganese oxide and the following addition components: 2.16% MgO, 1.40% CaO, 2.65% SrO, 50% $SiO_2$, with essentially the same results.

Example 4

The process of Example 1 was repeated except that the digestion was carried out in two stages by starting out with only ½ gram of molasses in the acid and then adding another ½ gram after the first hour of operations. Manganese extraction was 168% higher than in the single digestion of Example 1.

In the two stage operation exemplified herein, the amount of reducing agent used in each stage may be varied. For example, 12½ to 87½% of the agent, typically 50% thereof as illustrated, may be used in the first stage, and the balance thereafter.

Example 5

The process of Examples 1 and 2 may be repeated with essentially the same results, using an equal amount of hydrochloric acid in lieu of the sulphuric acid.

The presence of sugar in the preceding example also has the advantage of preventing the liberation of chlorine which would normally occur if sugar were not present when using hydrochloric acid. The undesired reaction is:

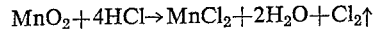

$$MnO_2 + 4HCl \rightarrow MnCl_2 + 2H_2O + Cl_2\uparrow$$

The sugar reduction proposed herein prevents the loss of chlorine by virtue of the following reaction:

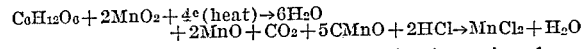

$$C_6H_{12}O_6 + 2MnO_2 + 4e(heat) \rightarrow 6H_2O + 2MnO + CO_2 + 5CMnO + 2HCl \rightarrow MnCl_2 + H_2O$$

While preferred embodiments of the invention have been described above, it is apparent that various changes and modifications can be made without departing from the scope of the invention as defined in the ensuing claims.

I claim:

1. The method of extracting manganese from naturally occurring ores containing same in a valence state greater than two, which comprises digesting said ore with a dilute aqueous solution of a mineral acid in the presence of a reducing sugar at a temperature of up to about 180° F. whereby said manganese is reduced and dissolved in said solution.

2. The method of claim 1 wherein said acid is sulphuric acid.

3. The method of claim 1 wherein said acid is hydrochloric acid.

4. The method of claim 1 wherein the reducing sugar is selected from the group consisting of glucose and fructose.

5. The method of claim 1 wherein said aqueous solution contains up to 20% by weight of acid.

6. The method of claim 1 wherein said aqueous solution contains between 1 and 20% by weight of acid.

7. The method of claim 1 wherein said solution comprises 10% by weight of sulphuric acid.

8. The method of claim 1 wherein from 22 to 90% by weight of reducing sugar, based on the weight of manganese in the mineral treated, is used in said digesting step.

9. The method of claim 4 wherein the reducing sugar is used in the form of molasses.

10. The method of extracting manganese from naturally occurring ore containing same in a valence state greater than two, which comprises digesting said ore at superatmospheric temperature of up to about 180° F. in a dilute aqueous solution of an acid selected from the group consisting of sulphuric acid and hydrochloric acid, and in the presence of a reducing sugar, continuing said digestion until a substantial amount of the manganese in the ore has been reduced and dissolved and thereafter filtering the resulting solution from the undissolved residual ore.

11. The method of claim 10 wherein said temperature is between 150–180° F.; the digestion is continued for at least about two hours; and the acid solution comprises a sulphuric acid solution containing up to about 20% acid by weight.

12. The method of claim 11 wherein from 25 to 100% molasses, based on the weight of manganese content of the ore, is used in said acid digestion.

13. The method of extracting manganese from naturally occurring ore containing same in a valence greater than two, which comprises digesting said ore at a temperature between 150 and 180° F. in up to 20% by weight sulphuric acid solution for a period of at least about two hours and in the presence of molasses containing both glucose and fructose, and thereafter filtering the resulting acid solution from residual undissolved ore.

References Cited in the file of this patent

UNITED STATES PATENTS

| | | |
|---|---|---|
| 1,013,498 | Koehler | Jan. 2, 1912 |
| 2,668,105 | De Jahn | Feb. 2, 1954 |
| 2,737,441 | Nossen | Mar. 6, 1956 |
| 2,945,757 | Hoekstra | July 19, 1960 |

OTHER REFERENCES

Latimer, "Oxidation Potentials," Prentice-Hall, Inc., New York, 1938, pages 119 and 222.

Karrer, "Organic Chemistry," Nordeman Publishing Co., Inc., New York, 1943, page 295.